United States Patent [19]

Sugarman

[11] 4,217,520

[45] Aug. 12, 1980

[54] IMAGE DISPLAY FACEPLATE HAVING A CHROMATIC MATRIX

[75] Inventor: Meyer L. Sugarman, Northbrook, Ill.

[73] Assignee: Zenith Radio Corporation, Glenview, Ill.

[21] Appl. No.: 938,208

[22] Filed: Aug. 30, 1978

[51] Int. Cl.³ ............................................ H01J 29/32
[52] U.S. Cl. .................................... 313/472; 313/474
[58] Field of Search ............................... 313/474, 472

[56] References Cited

U.S. PATENT DOCUMENTS

| | | | |
|---|---|---|---|
| 2,898,495 | 8/1959 | Michlin | 313/472 |
| 3,146,368 | 8/1964 | Fiore et al. | |
| 3,558,310 | 1/1971 | Mayaud | |
| 3,569,761 | 3/1971 | Lange | |
| 3,582,701 | 6/1971 | Zeliotis | 313/472 |
| 3,632,339 | 1/1972 | Khan | |
| 3,748,515 | 7/1973 | Kaplan | 313/474 |
| 3,886,394 | 5/1975 | Lipp | |

OTHER PUBLICATIONS

Article Entitled, "Blackstripe High Contrast Color Picture Tube", by M. Ikegaki et al., in *Toshiba Review* (Japanese Edition), p. 10, Aug. 1976.

*Primary Examiner*—Palmer C. Demeo
*Attorney, Agent, or Firm*—Ralph E. Clarke, Jr.

[57] ABSTRACT

This disclosure depicts an image display having a viewing faceplate for exhibiting an informational color image. The faceplate has deposited on an inner surface thereof a light-absorbing matrix surrounding mutually spaced elemental areas. The faceplate and each area includes a plurality of different colorants. The faceplate shows a body color of an undesired hue. The image display is characterized by the matrix having a color complementary to the undesired hue effective to counteract the hue and provide a substantially neutral body color.

5 Claims, 4 Drawing Figures

IMAGE DISPLAY FACEPLATE HAVING A CHROMATIC MATRIX

BACKGROUND OF THE INVENTION AND PRIOR ART STATEMENT

This invention relates primarily to image displays such as television cathode ray picture tubes and panel displays, and is particularly concerned with the quality of the body color of the unexcited viewing screens of such displays.

The viewing screens of image displays such as color television picture tubes of the aperture-mask type commonly comprise islands of light-emitting phosphor deposits surrounded by a black, light-absorbing matrix. This matrix is popularly referred to as "black surround," and a tube having black surround is well-known in the art as the black matrix tube.

The screen of the black matrix tube is best described in company with an illustration, comprising FIG. 1. This illustration is FIG. 4 of a disclosure by Fiore and Kaplan, U.S. Pat. No. 3,146,368, addressed to a cathode-ray tube with color dots spaced by black, light-absorbing areas. A triad of deposits of phosphor dots is shown, the dots comprising a red-light-emitting phosphor 10, a blue-light emitting phosphor 12, and a green-light-emitting phosphor 14. The name "black surround" is derived from the fact that the phosphor deposits are mutually separated from one another over the screen area and a light-absorbing material 16 is emplaced in the spaces between or around phosphor deposits 10, 12 and 14. Thus the full surface of the image screen, excluding the elemental phosphor areas, is formed of, or coated with, a black, light-absorbing material 16. The electron beams of the tube are larger in cross-sectional area than the phosphor dots; the landing area of the respective beams is indicated by the dash lines 17 encircling each of the phosphor dots. The concept of black surround made possible a cathode ray picture tube with a greater brightness and contrast than attainable with prior art tubes.

The phosphor deposits shown by FIG. 1 are dots; the deposits can as well be stripes; television cathode ray tubes having screens of this type are known as striped-screen picture tubes. A fragment of a striped screen with associated shadow mask is shown by FIG. 2. Strips of light-emitting phosphor comprising a red-light-emitting phosphor stripe 20, a green-light-emitting phosphor stripe 22, and a blue-light-emitting phosphor stripe 24 are shown as being deposited on the multi-color screen 26. The phosphor stripes are arranged in triads each associated with one of the apertures 28 of adjacent aperture mask 20. Three electron beams 30, indicated by the bracket, selectively excite associated phosphor stripes of each triad. Surrounding the phosphor stripes 20, 22 and 24, and interposed therebetween are stripes 32, comprising a light-absorptive black surround.

To fulfill the desired objective of maximum light-absorption, material 16 and stripes 32 are comprised of a material black in value and maximally non-reflective. The black surround comprises a deposit of material having the characteristic of being intensely black, or convertible to an intense black during tube processing, such as graphite, manganous carbonate, particles of carbon, or silver chloride.

Many processes are known in the art for depositing a black surround on the faceplate of image displays. A typical process is that disclosed by Mayaud in U.S. Pat. No. 3,558,310. An organic compound such as an unpigmented polyvinyl alcohol (PVA) and a sensitizing agent is printed on the faceplate from three color-center locations, leaving a pattern of clear stripes (or dots) which are intended to receive the triads of color phosphors. The faceplate is coated with a slurry containing graphite, for example. After the graphite has been dried, a hydrogen peroxide solution is used as a "developer" to remove the PVA deposits, leaving a pattern of black graphite surrounding clear glass areas on which are subsequently deposited the various color phosphors.

Continuing development to further increase the brightness and contrast aspects of tri-color picture tubes led to the structure described and claimed in U.S. Pat. No. 3,114,065 issued to Sam H. Kaplan. This patent discloses combining one or more of the three phosphor materials which make up the tri-color screen with a filter that is highly transmissive of the color or wavelength of light emitted by its associated phosphor material, but is otherwise an attenuator throughout the visible spectrum. The colorimetry can be controlled and an attractively low value of reflectance is provided which enhances contrast.

The color filter elements may comprise inorganic pigments or metal resinates, also termed "lusters." It is common practice to filter only the red-light-emitted and blue-light-emitting layers, while leaving green-light-emitting areas unfiltered. Such supplements to the phosphors as the aforedescribed filters may be termed "contrast-enhancing colorants" (and are so-referred to hereafter) when used in connection with picture tubes because of their ability to pass a certain portion of the spectrum of visible light while being opaque to other portions. Contrast is enhanced by the selective absorption of normal ambient light by the colorants, thus reducing the reflection of ambient light from the faceplate.

U.S. Pat. No. 3,886,394 to Lipp discloses an image display employing phosphor particles which are filter-coated. The filter particles are said to cover between 20% and 80% of the surfaces of the phosphor particles. It is alleged that by only partially covering the phosphor particles with filter particles, the transmission, absorption and reflection of light may be "tailored" to optimize the brightness and contrast of the display image in relatively bright ambients. Two embodiments are disclosed: one of which there is a single layer of phosphor particles coated as described and the other consisting of two layers comprising the coated phosphor particles, and over this a layer of phosphor particles which are uncoated.

Another example of contrast-enhancing colorant used in conjunction with a picture tube is the black stripe high-contrast color picture tube described in an article by Ikegaki et al (Toshiba Review, August 1976). A "graduated" pigment system is disclosed in which the concentration of pigment varies through the blue phosphor field, with the heaviest concentration of pigment being nearest the screen. A large increase in contrast and a slight increase in brightness over the standard Toshiba black-striped tube is said to be attained.

Colorants are defined as "those substances which modify the perceived color of objects, or impart color to otherwise colorless objects. They are characterized by having selective absorption and scattering of light so that they modify the spectral energy distribution of light falling upon them." (*Principles of Color Technology,*

Billmeyer and Saltzman. New York: John Wiley and Sons, 1964.)

In the context of this disclosure, a "colorant" is defined as any material associated with the screen, including the faceplate itself, that contributes to the body color of the faceplate. "Body color" in turn is defined as the predominant hue of the faceplate under normal ambient light when the screen is unexcited. Included in the category of colorants are the phosphors and colored pigments and other filter materials which, in combination, may make up a viewing screen. In picture tubes that have no contrast-enhancing colorants, the body color of the unexcited screen is commonly a neutral gray. This gray aspect is attributable to the fact that phosphor materials, when unexcited, are generally colorless (with some exceptions), or if colored, the color is usually of very low intensity. Certain of the filters and pigments that are used as contrast-enhancing colorants, however, may be highly colored. If the screen contains an equal blend of the primaries of these colorants such as red, green, and blue, the body color will still appear as gray. This gray appearance is attributable to the fact that the viewing screen constitutes a "microstructure" of discrete particles which the human eye is unable to resolve into discrete color elements. So in effect, the eye integrates the primary colors and the faceplate appears as gray in totality. If one of the primary colors is not present, however, the body color will not appear as gray, but will appear as the product of the combination of the two remaining primary colors. For example, if only red and blue primaries are present, the body color will appear as a bluish-red, or magenta.

It is desirable that the body color of image display screens be neutral in aspect; that is, be of a neutral achromatic gray rather than a definite color such as the aforedescribed magenta. Any color other than a neutral gray is generally considered to be unacceptable.

OBJECTS OF THE INVENTION

It is a general object of this invention to provide means for improving the appearance of image displays.

It is a less generally object of the invention to provide means for attaining a neutral body color in the viewing screens of image displays.

It is a more specific object of the invention to provide means for attaining a neutral body color in image display viewing screens having contrast-enhancing colorants.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
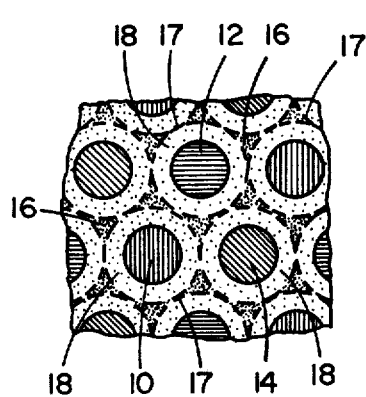
FIG. 1 is a schematic view of a fragment of an image display screen showing the relationship of components of a dot screen with black surround.
Figure 2:
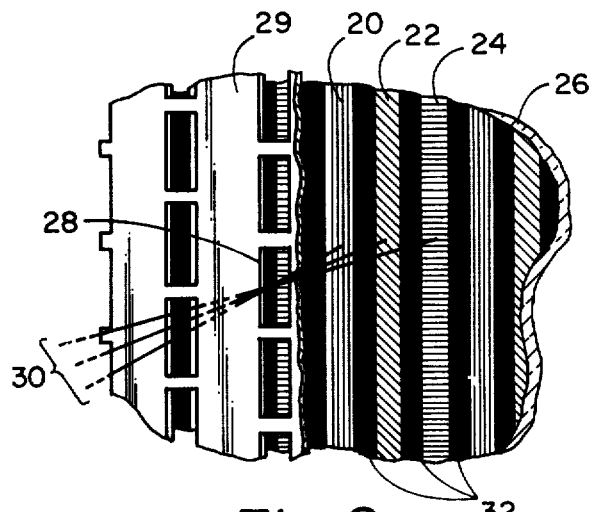
FIG. 2 is a fragmentary perspective view of a faceplate-aperture mask assembly for a striped-screen picture tube with black surround.
Figure 3:
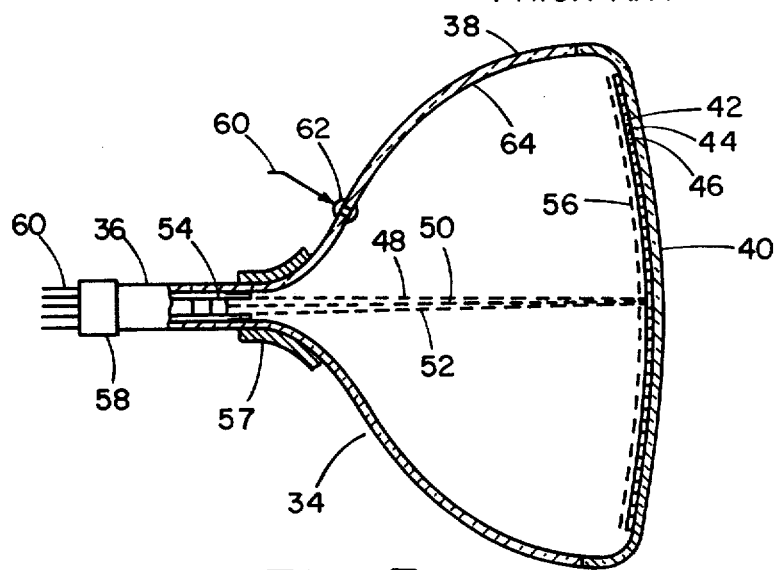
FIG. 3 is a schematic top view in longitudinal cross-section of a color television cathode ray image display in which the invention is advantageously employed.

An example of an image display in which the invention is advantageously employed is the multi-color cathode ray picture tube of the shadow-mask type shown by FIG. 3. The primary components of the picture tube 34 comprise an evacuated envelope including a neck 36, a funnel 38 and a viewing faceplate 40 for exhibiting a color television image. On the inner surface of faceplate 40 is deposited a light-absorbing matrix (not shown, but as described heretofore in connection with FIGS. 1 and 2). The light-absorbing matrix surrounds triads of mutually spaced target elements 42, 44 and 46 which, for exemplary purposes, may be said to comprise either dots or stripes. Each target element 42, 44 and 46 includes the deposit of one of three types of phosphors emitting red, green or blue light in response to selective excitation by one of three electron beams 48, 50 and 52, which scan the inner surface of faceplate 40. The three beams have their origin in electron gun 54 disposed within neck 36 substantially as shown. A foraminated electrode 56, commonly termed a "shadow mask" is used for color selection, as is well-known in the art. A yoke 57, in conjunction with ancillary sweep circuits, provides for scanning beams 48, 50 and 52.

Picture tube 34 also comprises a base 58 which provides entrance means for a plurality of electrically conductive lead-in pins 60 which introduce into the evacuated envelope the relatively low voltages in the range of one to fifteen kilovolts for the operation of electron gun 54. The relatively high voltage for operation of the gun 54 and the cathode ray tube 34 itself; that is, a voltage typically in the range of twenty-four to thirty-two kilovolts for excitation of the main focusing lens of gun 54 and the picture screen, is indirectly supplied through lead 60 which is connected to anode button 62. Anode button 62 in turn introduces the high voltage through the funnel 38, making internal contact with a thin, electrically conductive coating 64 disposed on the inner surface of funnel 38. The high voltage on inner conductive coating 64 comprises the ultor voltage for operation of picture tube 34, as is well-known in the art.

The invention can also be advantageously employed in a type of image display known as the panel display. The faceplates of image displays comprise triads of mutually spaced target elements surrounded by the light-absorbing matrix.

An improved image display according to the invention comprises a viewing faceplate for exhibiting an informational color image. The faceplate has deposited on the inner surface thereof a light-absorbing matrix surrounding mutually spaced elemental areas. The faceplate and the areas include a plurality of different colorants. The faceplate shows a body color of an undesired hue. The image display is characterized by the matrix having a color complementary to the hue effective to counteract the hue and provide a substantially neutral body color.

An object of the invention is to provide a desired body color, preferably, a neutral gray. The body color is determined by the combined hues of the various discrete colorants of which a faceplate is comprised, including the faceplate itself. In the multi-color picture tube described, the colorants include the "natural"

color of the phosphor deposits; that is, the color of the deposits when unexcited. Also included in the category of colorants in the context of this application, specifically in those tubes having contrast-enhancing colorants, are the filter and pigment materials described heretofore in connection with the disclosures of Kaplan—U.S. Pat. No. 3,114,065, Lipp—U.S. Pat. No. 3,886,394, and in the article of Ikegaki (Toshiba). As noted, the phosphor deposits are generally colorants of very low intensity and hence contribute relatively little to body color. The contrast-enhancing colorants on the other hand are generally of higher intensity and can contribute very noticeably to body color.

Further with reference to FIG. 3 and the picture tube according to the invention, selected ones of target elements 42, 44 and 46 are in association with at least one contrast-enhancing colorant of like color. Faceplate 40 should be considered for purposes of example as showing a body color of an undesired hue resulting from a preponderance of at least one of said colorants, whether a phosphor colorant, a contrast-enhancing colorant, or a combination thereof. The image display of this example is characterized by the matrix having according to the invention a color complementary to the hue effective to counteract the hue and provide the neutral body color.

The hue of the body color may be magenta, for example, resulting from a preponderance of red and blue colorants. The color of the matrix will then be, according to the invention, the complement of magenta; that is, a green. This green may be produced by the presence in the matrix of a pigment such as chromic oxide, nickel oxide, or cobalt tungstate.

Figure 4:
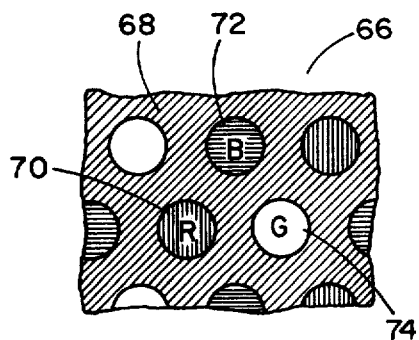
FIG. 4 is a schematic view of a fragment of an image display screen showing color relationships according to the invention.

The means according to the invention for counteracting an undesired predominant hue is shown schematically by FIG. 4. A fragment of an unexcited image display faceplate 66 of the dot-screen type is shown as having deposited on the inner surface thereof a light-absorbing matrix 68. Matrix 68 surrounds a triad of mutually spaced phosphor target elements 70, 72 and 74, designated R, B and G indicating the emission of red, blue and green light, respectively. The graphic symbol lines–vertical lines for red in target element 70, and horizontal lines for blue in target element 74–are not intended in this example to indicate the color of the light emitted by phosphors (the screen is considered to be unexcited) but rather to indicate the color of the associated contrast-enhancing colorants of like color. It will be noted that target element 74, green, is devoid of an associated contrast-enhancing colorant. In consequence, faceplate 66 will show a body color of an undesired hue; that is, a magenta resulting from a preponderance of red and blue colorants. Matrix 68, according to the invention, has a color complementary to the hue of magenta effective to counteract the hue and provide the desired body color. The color of light-absorbing matrix 66 is complementary to the hue of magenta and is indicated by the diagonal graphic symbol lines as being green, in this example. It is to be noted that the means according to the invention is equally efficacious when applied to the type of viewing screen known as the striped-screen, shown by FIG. 2.

The complementary color has been described in the foregoing as being green; this invention is in no way limited to the use of green to complement as undesired hue. For example, the undesired hue may be a blue; in this case the hue of the chromatic matrix according to the invention would be compounded to comprise a complement of blue, which is yellow.

The means for compounding and applying the chromatic matrix according to the invention are based on formulations and procedures well-known to one having ordinary skill in the art. For example, basic formulations and processes taught by Mayaud—U.S. Pat. No. 3,558,310; Fiore et al—U.S. Pat. No. 3,365,292; or Khan—U.S. Pat. No. 3,362,339, can be followed. Formulating the chromatic matrix requires a substitution of a suitable pigment or other colorant able to impart the complementary color to the matrix in lieu of the material normally used to cause the matrix to be black. For example, if it is desired that the matrix be green to complement magenta, a nickel oxide, cobalt tungstate, or preferably, chromic oxide can be used. The relative concentrations of the substitue; that is, chromic oxide et al, are not critical, and the proper concentration to produce a suitable intensity and value of the desired complementary color in the chromatic matrix can be determined without undue experimentation.

The ability of the chromatic matrix according to the invention to absorb light not be adversely affected by compounding it to exhibit a color complementary to an undesired hue. The aggregate area of the viewing screen occupied by the matrix is commonly about 25% and may in some tube types be as high as 50%. Because the area of the matrix is relatively large, a color complementary to the hue supplied by the matrix need be of relatively low intensity to counteract the hue.

The chromatic matrix according to the invention is effective to counteract an undesired hue whatever the source. For example, the undesired hue may be due solely to a preponderance of color of an unexcited phosphor in a picture screen having no contrast-enhancing colorants. An example of a phosphor manifesting, when unexcited, a color of relatively higher intensity is zinc cadmium sulfide; silver (ZnCds;Ag). The hue of this phosphor is red. The matrix according to the invention would then comprise a color complementary to red, which is a cyan. Another example: an undesired faceplate hue may be attributed to a certain type of faceplate glass, which may be a light green, for example. In this case, the chromatic matrix according to the invention would comprise a color complementary to green; that is, a magenta, accomplished by compounding the matrix with a suitable magenta coloring agent.

Other changes may be made in the above-described invention without departing from the true spirit and scope of the invention herein involved, and it is intended that the subject matter in the foregoing depiction shall be interpreted as illustrative and not in a limiting sense.

I claim:

1. An image display having a viewing faceplate for exhibiting an informational color image, said faceplate having a light-absorbing matrix surrounding mutually spaced elemental areas, said faceplate and said areas including a plurality of different colorants, said faceplate showing a body color of an undesired hue, with said image display being characterized by said matrix having a color complementary to said hue effective to counteract said hue and provide a substantially neutral body color.

2. An image display having a viewing faceplate for exhibiting a color television image, said faceplate having a light-absorbing matrix surrounding mutually spaced elemental areas, each area including one of three colorants comprising red, green or blue light-emitting phosphors and associated contrast-enhancing colorants of like color, said faceplate showing an undesired magenta body color resulting from a preponderance of red and blue colorants, said image display being characterized by said matrix including a green colorant effective to complement said magenta body color and provide a substantially neutral body color.

3. The image display defined by claim 1 wherein said green colorant is selected from a group consisting of nickel oxide, cobalt tungstate, and chromic oxide.

4. An image display comprising a multi-color cathode ray picture tube of the shadow-mask type having an evacuated glass envelope including a neck, a funnel and a viewing faceplate for exhibiting a color television image, said faceplate having a light-absorbing matrix surrounding triads of mutually spaced target elements, each target element of each triad including a deposit of one of three types of phosphor colorants emitting red, green or blue light in response to excitation by a three-beam electron gun located in said neck, with selected ones of said target elements being in association with at least one contrast-enhancing colorant of like color, said faceplate showing a body color of an undesired hue resulting from a preponderance of at least one of said colorants, said image display being characterized by said matrix having a color complementary to said hue effective to counteract said hue and provide a substantially neutral body color.

5. The image display defined by claim 4 wherein said hue is magenta resulting from a preponderance of red and blue colorants, and wherein said color complementary to said hue is green produced by the presence in said matrix of pigments selected from a group consisting of nickel oxide, cobalt tungstate, and chromic oxide.

* * * * *